(12) United States Patent
Lassar et al.

(10) Patent No.: US 7,232,226 B2
(45) Date of Patent: Jun. 19, 2007

(54) COLOR-GENERATING DEVICE AND DISPLAY SYSTEM

(75) Inventors: Noah Lassar, San Diego, CA (US); Steven W. Steinfield, San Diego, CA (US); Mohammad M. Samii, La Jolla, CA (US); Jack H. Schmidt, Carlsbad, CA (US); Matthew Giere, San Diego, CA (US); David Tyvoll, La Jolla, CA (US); Winthrop D. Childers, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 536 days.

(21) Appl. No.: 10/728,642

(22) Filed: Dec. 5, 2003

(65) Prior Publication Data

US 2004/0080721 A1 Apr. 29, 2004

Related U.S. Application Data

(63) Continuation of application No. 10/251,311, filed on Sep. 19, 2002, now Pat. No. 6,921,175.

(51) Int. Cl.
*G03B 21/14* (2006.01)
*G02B 26/02* (2006.01)
*G02B 5/24* (2006.01)

(52) U.S. Cl. .................. 353/84; 359/228; 359/886
(58) Field of Classification Search ............... 359/228, 359/886; 353/84
See application file for complete search history.

(56) References Cited

U.S. PATENT DOCUMENTS

| 4,589,730 | A | 5/1986 | Obu |
| 4,795,243 | A | 1/1989 | Suzuki |
| 5,181,016 | A | 1/1993 | Lee |
| 6,188,815 | B1 * | 2/2001 | Schiaffino et al. ............. 385/16 |
| 6,753,846 | B2 * | 6/2004 | Takeuchi et al. ............ 345/108 |
| 6,924,792 | B1 * | 8/2005 | Jessop ......................... 345/179 |
| 2002/0167714 | A1 * | 11/2002 | McBride et al. ............. 359/298 |

FOREIGN PATENT DOCUMENTS

| EP | 0884714 A2 | 12/1998 |
| EP | 1111419 A1 | 6/2001 |

\* cited by examiner

*Primary Examiner*—Christopher Mahoney

(57) ABSTRACT

A light-filtering element for a display device is provided. The element includes at least one filter having a chamber with a filtering fluid, the filtering fluid selectively disposed in an optical path, and a liquid motion actuator selectively configured to move the filtering fluid substantially into and out of the optical path.

25 Claims, 2 Drawing Sheets

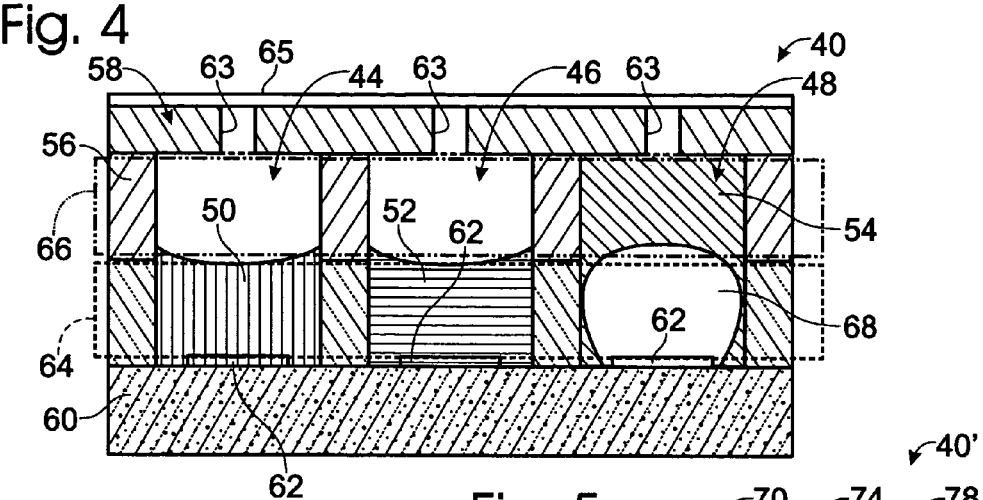
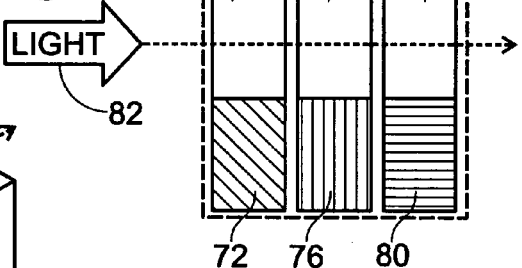
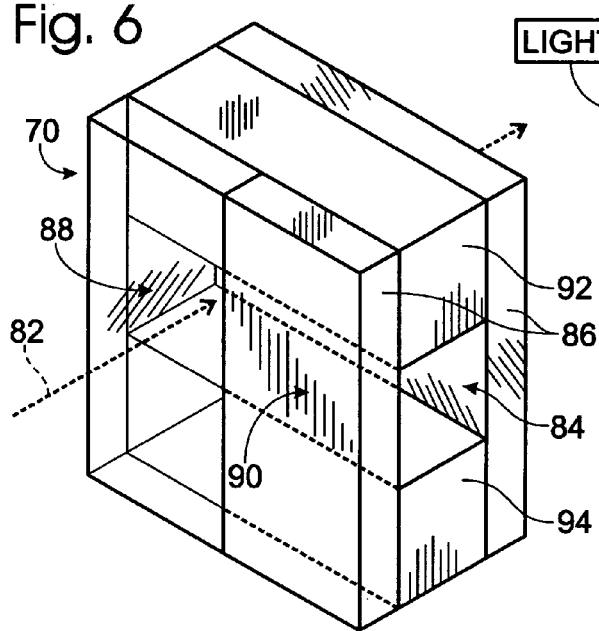
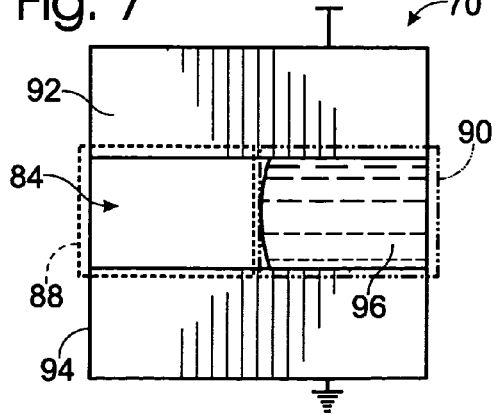
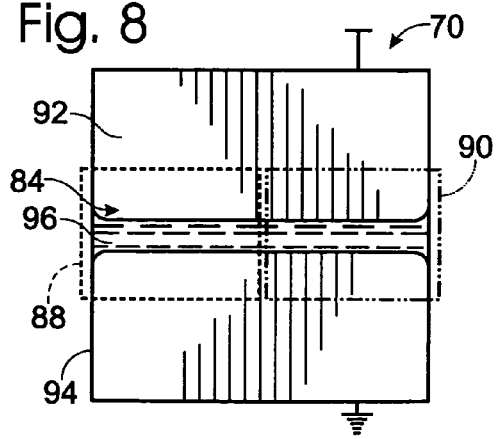

COLOR-GENERATING DEVICE AND DISPLAY SYSTEM

CROSS-REFERENCE TO RELATED APPLICATION

This is a continuation of application Ser. No. 10/251,311 filed on Sep. 19, 2002, now U.S. Pat. No. 6,921,175 which is hereby incorporated by reference.

BACKGROUND OF THE INVENTION

Various display systems have been used over the years to generate images. Such display systems may employ image devices, such as cathode ray tubes (CRTs), liquid crystal displays (LCDs), or electrically-addressed emissive displays, e.g. plasma displays. The display systems further may incorporate a passive display screen or an active display screen.

Many of today's display systems include a light source, a color wheel, and a spatial light modulator. Light generated from the light source in such a display system is directed onto the color wheel, which sequentially filters light from the light source, typically producing red light, green light, and blue light. The red light, green light, and blue light thus typically are sequentially sent to the spatial light modulator, which modulates the colored light depending on the desired image. The position of the color wheel therefore often must be tracked such that the spatial light modulator appropriately modulates light to generate an image.

The use of a color wheel may affect the image quality and cost of the display system. For example, the mechanics required to spin the color wheel typically are large and cumbersome. The use of a color wheel in combination with a spatial light modulator also may result in flickering and/or sequential color artifacts. These sequential color artifacts may include rainbow-colored shadows that follow rapidly-moving objects in video images. Moreover, the use of a color wheel may affect the overall brightness of the image. To overcome the reduction in brightness due to the color wheel, a high-powered light source may be incorporated within the display system. However, high-powered light sources may increase the cost of the display system and may consume a significant amount of power during operation. Additionally, fans may be necessary to cool the light source. Such fans may increase the noise and overall size of the display system.

SUMMARY OF THE INVENTION

A light-filtering element for a display device is provided. The element includes at least one filter having a chamber with a filtering fluid, the filtering fluid selectively disposed in an optical path. The element further includes a liquid motion actuator selectively configured to move the filtering fluid substantially into and out of the optical path.

DESCRIPTION OF THE DRAWINGS

FIG. 4 is a cross-sectional view taken along lines 4-4 in FIG. 3, showing a configuration of color filters in the color element.

FIG. 5 is a cross-sectional view of another color element with multiple color filters in accordance with another embodiment of the present invention.

FIG. 6 is an isometric view of a color filter of the color element shown in FIG. 5.

FIG. 7 is a schematic illustration of the color filter of FIG. 6 in a non-filtering state.

FIG. 8 is a schematic illustration of a color filter similar to that of FIG. 7, but with the color filter in a filtering state.

DETAILED DESCRIPTION

Figure 1:
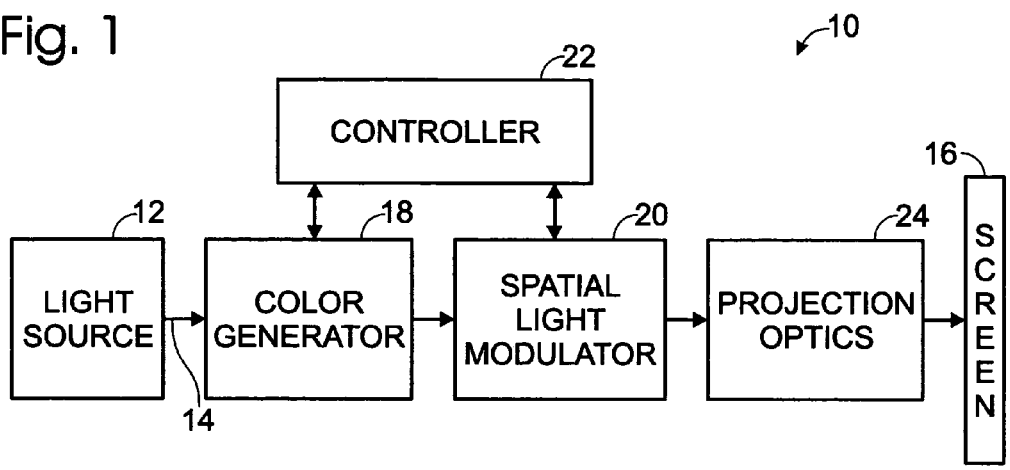
FIG. 1 is a block diagram of a display system having a color generator according to an embodiment of the present invention.

Referring initially to FIG. 1, a display system according to an embodiment of the present invention is shown generally at 10. Display system 10 may be any suitable system adapted to display images, including, but not limited to, rear-projection display systems, front-projection display systems, etc.

Display system 10 typically includes a light source, or illumination source, 12. Illumination source 12 may be configured to generate light, and to direct light along an optical path 14 toward a screen 16. Illumination source 12 may be any suitable light-generating device, including, but not limited to, a mercury lamp.

Light generated via illumination source 12 may be further directed onto a color generator, or color-generation device, 18. Color generator 18, as described in more detail below, may include a moveable filtering fluid, such as an absorption medium, that selectively filters light as it passes through the filter. The filtering fluid is typically a liquid, however, any moveable substance may be used, including a gas, a gelatin resin, etc. As discussed below, a liquid motion actuator or promotor, such as a bubble generator or a piezo-element, may be used to move the filtering fluid. Liquid motion actuator, as used herein, includes any device adapted to promote the filtering fluid to move into, and/or out of, the optical path.

Color generator 18 typically is configured to produce color-separated light. The color-separated light may be further directed onto a spatial light modulator 20, such as a micromirror array, digital light processor, or similar device. Spatial light modulator 20, in turn, may be adapted to modulate incident light to generate an image on screen 16. Both color generator 18 and spatial light modulator 20 may be managed by controller 22.

Modulated light from spatial light modulator 20 may be focused and positioned prior to impinging screen 16. In the exemplary system, spatial light modulator 20 may direct modulated light through projection optics 24. Typically, projection optics 24 are configured to focus, size, and position the colored light onto screen 16 to produce an image. Projection optics 24 may include one or more projection lenses.

Figure 2:
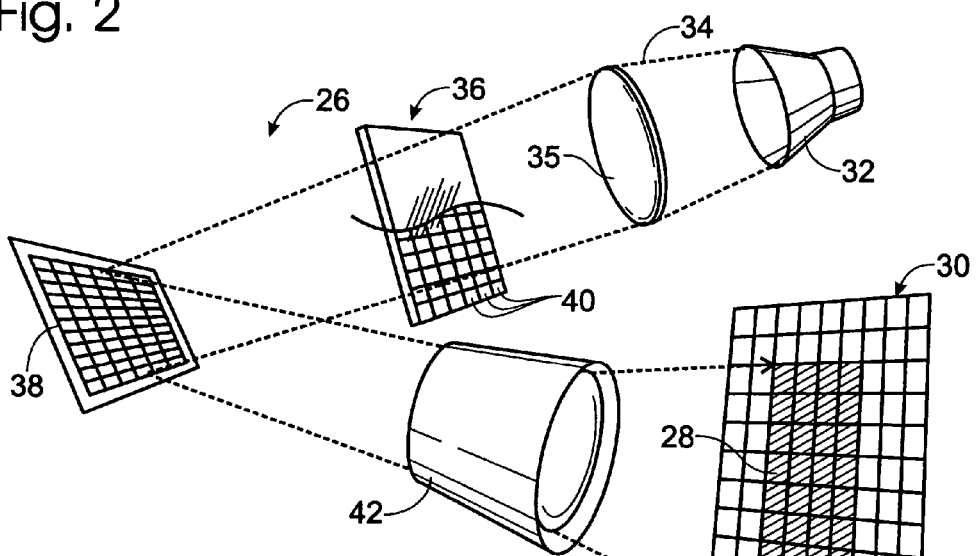
FIG. 2 is a schematic diagram of a display system showing a cut-away color generator including a plurality of color elements, according to an embodiment of the present invention.

FIG. 2 schematically illustrates an exemplary display system 26. Display system 26 may be configured to generate a colored image 28 on a screen or display surface 30. In the depicted display system, light source 32 is illustrated as a high-pressure mercury lamp, but it need not be limited to such a lamp. As indicated, light source 32 may generate light 34, and direct it along an optical path through display system

26. Light 34 may be directed through optics 35 (such as a lens or lenses) through color generator 36, and onto spatial light modulator 38.

Color generator 36 may include a plurality of color elements 40 configured to filter different wavelengths of light. Each color element thus may be configured to produce a color that corresponds to the appropriate color of a portion of the image. The color generator may be digitally controlled, such that each color element selectively filters out some wavelengths of light, while allowing other wavelengths of light to pass through. Each color element also may be modulated to affect the intensity of light passing through the color element, as will be understood upon reading further.

Colored light, which passes through each color element, may be further directed onto spatial light modulator 38, which is depicted herein as a micromirror array. Each color element may correspond to a mirror, or a plurality of mirrors, within spatial light modulator 38. Colored light may be reflected by each mirror in the micromirror array, through optics 42, and onto display surface 30 to produce image 28.

Figure 3:
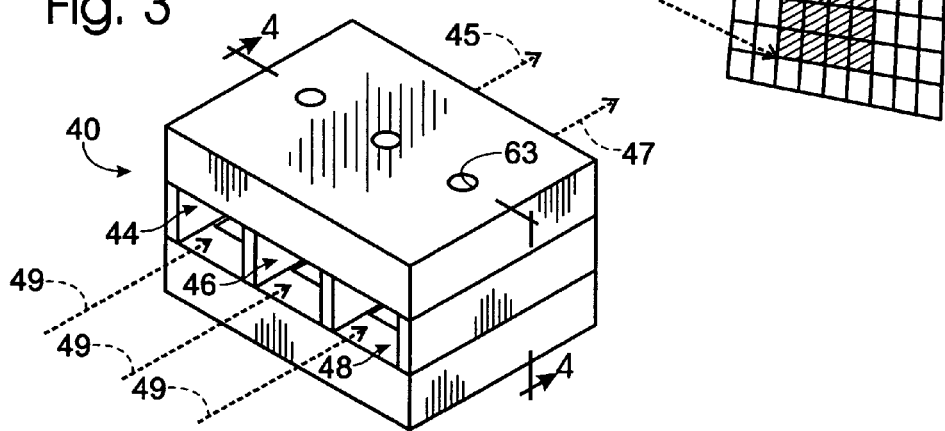
FIG. 3 is an isometric view of a color element with multiple color filters according to an embodiment of the present invention.

In one embodiment, light may be modulated by the display elements so as to accommodate production of various intensities of resultant light. Various shades of gray, for example, may be produced by selected time-interleaving of white light (produced where all filters are in the pass-through state) with no light (where all filters are in the filtering state). Alternatively, or additionally, incident or resultant light may be modulated by a separate spatial light modulator configured to selectively disrupt (or pass) white and/or colored light. Either arrangement may be configured to produce a full color gamut. FIG. 3 illustrates a color element 40 constructed in accordance with one embodiment of the present invention. As described above, multiple color elements may form a color generator for a display system. Typically, color element 40 includes a plurality of color filters, or cells, as illustrated at 44, 46, and 48. Color filters may be disposed in the optical path such that light 49 is directed through the color filters. Each color filter, in turn, may be configured to allow particular wavelengths (colors) of light to pass through, while blocking other wavelengths (colors) of light. Thus, each color filter may be capable of dynamically producing a selected color light.

To accomplish the aforementioned filtering, each filter may include a filtering fluid. Typically, the filtering fluid of the filter is adapted to allow particular colors to pass through the filter, while blocking other colors. For example, the filtering fluid may be a pigmented liquid or dye, including, but not limited to, ink, toner, or other suitable color fluid. The filtering fluid also typically is moveable such that it may be selectively moved to within the optical path of impinging light.

As a non-limiting example, each color element may include a red filter 44 having a red-filtering fluid, a green filter 46 having a green-filtering fluid, and a blue filter 48 having a blue-filtering fluid. When the red-filtering fluid in red filter 44 is in the optical path, red light 45 may be passed through the red filter, while other color light is blocked. Similarly, when the green-filtering fluid in green filter 46 is in the optical path, green light 47 is passed through the green filter, while other color light is blocked. Similarly (but not shown), when the blue-filtering fluid in blue filter 48 is in the optical path, blue light is passed through the blue filter, while other color light is blocked. It should be appreciated that other color filters may be used, including, but not limited to, cyan filters, yellow filters, magenta filters, etc. Moreover, although three filters are illustrated, any number of filters may be used.

FIG. 4 further illustrates color element 40, shown in FIG. 3. Specifically, color element 40 includes three color filters, red filter 44, green filter 46, and blue filter 48. As discussed above, each color filter may include a moveable medium, or filtering fluid, 50, 52, 54. The fluid may be retained within a chamber, typically in the form of a walled structure, as shown. For example, walls 56, and barriers 58, 60, define the chambers in color element 40. As described below, walls 56 and barrier 58 are typically constructed of a photo-imageable polymer or other suitable material. Lower barrier 60 is typically a substrate, such as silicon.

Lower barrier 60, in the exemplary embodiment, serves as the bottom of the chambers. Within each chamber, disposed on lower barrier 60 may be a liquid-motion actuator, also referred to in the present illustration as a bubble generator 62. Each bubble generator 62 may be configured to produce a bubble within the chamber, displacing the fluid from the bottom portion of the chamber. Bubble generators 62 typically take the form of thin film resistors, each adapted to be activated to generate a bubble within the corresponding chamber. As shown, multiple thin film resistors may be packed onto lower barrier 60. In some embodiments, hydrophilic capillaries or other surface features may be disposed adjacent the resistors to draw fluid into the region around the resistors when the resistors are not actuated.

Any excess gas (such as due to a generated bubble) may be released through an outlet coupled with the chamber. For example, each chamber (shown in FIGS. 3 and 4) include a vent or outlet 63 to reservoir 65, such as a plenum chamber, to accommodate a sudden increase in pressure due to the boiling of the fluid within the chamber. In some embodiments, oil, or other like substance, may be used to prevent vapor loss from vents 63. Alternatively, vents 63 may be covered with a flexible membrane.

Each chamber may further include a transparent region 64 (indicated by dashed lines) and an opaque region 66 (indicated by dashed, double-dot lines). Light directed onto color element 40 passes through the transparent region of a filter when the filtering fluid is within the transparent region. Thus, depending on the state of the color filter and the position of the filtering fluid, light may or may not pass through a color filter.

Each color filter may have an actuated (or filtering) state and a non-actuated (or non-filtering) state. In the filtering state, the light impinging on the filter may be selectively passed through the filtering fluid, (e.g. colored fluid). Thus, depending on the filtering fluid, some wavelengths (colors) of light may be passed through the filter, while other wavelengths (colors) of light are blocked. Typically, in a filtering state, fluid within the filter is disposed substantially within the transparent region of the filter. In this configuration, as light passes through the transparent region, it is directed through the fluid, which filters the light to generate a color. In a non-filtering state, light may be blocked such that little or no light passes through the transparent region.

The above color element may be produced by depositing an array of thin film resistors onto a transparent substrate. Thereafter, a layer of direct imageable material (DIM) may be spun or otherwise disposed onto the substrate to create a transparent barrier over the resistors, thus creating bubble chambers. Filtering fluid, such as ink, may then be spread over the transparent surface, filling in the bubble chambers. The bubble chambers then may be sealed with another transparent layer. Thereafter, light from a light source may be projected onto the color element, and by selectively actuating the resistors, bubbles may be produced in the optical path, thereby selectively blocking the optical path.

FIG. 4 illustrates two filters in a filtering state and one filter in a non-filtering state. A filtering state, as used herein, occurs when the filtering fluid is substantially within the optical path of the light. A non-filtering state, as used herein, occurs when the filtering fluid is substantially outside the optical path of the light. It should be appreciated that regardless of state, the filtering fluid typically is not released from the filter.

Specifically, both filters 44 and 46 are in a filtering state, whereby the filtering fluid is substantially disposed within transparent region 64. Filter 48 is in a non-filtering state, with a bubble 68 disposed within transparent region 64. It should be appreciated that, in the exemplary embodiment, transparent region 64 is in the lower portion of each chamber (as viewed in FIG. 4), and opaque region 66 is in the upper portion of each chamber (again, as viewed in FIG. 4). Thus, both red filter 44 and green filter 46 are shown where their respective filtering fluids 50, 52 are in the transparent region.

Accordingly, filtering fluids 50, 52 in filters 44, 46 are in the bottom half of the chambers, such that the fluids are within transparent region 64. Light impinging on red filter 44 thus passes red light through filtering fluid 50. Likewise, light impinging on green filter 46 passes green light through filtering fluid 52. Red-filtering fluid 50 thus absorbs substantially all light except red light. Likewise, green-filtering fluid 52 absorbs substantially all light except green light.

In a non-filtering state, the filtering fluid within the filter may be substantially disposed within opaque region 66, and thus substantially outside of transparent region 64 such that no filtering occurs. A non-filtering state typically results when bubble generator 62 is activated. Upon activation, bubble generator 62 may produce a vapor bubble that forces fluid nominally within transparent region 64 to move into opaque region 66. In FIG. 4, filter 48 is shown in a non-filtering state. Specifically, bubble generator 62, associated with blue filter 48, may produce a vapor bubble 68. Bubble 68, in turn, has forced blue fluid 54 out of transparent region 64, and into opaque region 66. Accordingly, light directed toward filter 48 impinges bubble 68 and bubble 68 reflects the light such that little or no light passes through the blue filter.

Each color filter may dynamically produce at least one color. Thus, when a color filter is in a filtering state, light is filtered through the filtering fluid to generate a color light. Specifically, red filter 44, when in a filtering state, is configured to produce red light, green filter 46, when in a filtering state, is configured to produce green light, and blue filter 48, when in a filtering state, is configured to produce blue light. One or more color filters may be actuated at any one moment in time. Thus, where all three filters in a color element (red filter 44, green filter 46, and blue filter 48) are actuated, white light may be effectively produced by the color element (where red light, green light and blue light are additive to produce white light). Similarly, by actuating different combinations of filters, different colors may be produced. Moreover, having all three filters in non-filtering states may result in a color element that appears dark or black.

It should be noted that each bubble generator may be activated multiple times to modulate the emitted light, thereby affecting the intensity of the emitted light. For example, a bubble generator may be activated thousands of times per second.

FIG. 5 illustrates another color element for a color generator according to another embodiment of the present invention. As shown in FIG. 5, multiple color filters may be stacked to form a single color element 40'. The color filters 70, 74, 78 within color element 40' may include filtering fluids of different colors. In the exemplary embodiment, first color filter 70 may include a cyan-filtering fluid 72, second color filter 74 may include a magenta-filtering fluid 76, and third color filter 78 may include a yellow-filtering fluid 80. The depicted filters, in turn, may be disposed within the optical path of the light source such that light 82 may pass through the filters sequentially.

As described above, the fluid within each filter may be moveable such that the filter may be placed in an actuated (filtering) state or a non-actuated (non-filtering) state. In the filtering state, the fluid typically is substantially within the optical path such that the light passes through the fluid and is filtered. In the non-filtering state, the fluid typically is substantially outside the optical path such that light may pass through the filter unfiltered. In contrast to the aforementioned embodiment employing a bubble generator, the filter of FIG. 5 may employ a vacuum chamber, so as to permit substantially unfiltered passage of light through a region from which the filtering fluid has been removed.

Each filter, in turn, typically may be selectively controlled such that it is independently placed in a filtering state, or a non-filtering state. To produce color from color element 40', one or more filters typically are in filtering states. Thus, when cyan filter 70 is in a filtering state, and magenta filter 74 and yellow filter 78 are in non-filtering states, the light emitted from color element 40' typically is cyan. Similarly, when magenta filter 74 is in a filtering state and the other filters are in non-filtering states, the light emitted from color element 40' typically is magenta. Moreover, when yellow filter 78 is in a filtering state and the other filters are in non-filtering states, the light emitted from color element 40' typically is yellow.

Colors, other than cyan, yellow and magenta may be produced using a cyan filter, a yellow filter, and/or a magenta filter. For example, if both the cyan filter and the yellow filter are in filtering states, then the display element may appear green. The green color may result because the cyan filter blocks red light, but passes green light and blue light. The yellow filter similarly blocks blue light, but passes green light and red light. Since the cyan filter only passes green light and blue light, and the yellow filter only passes green light and red light, the only color to pass through both filters is the green light. Similarly, when the yellow filter (which passes green light and red light) and the magenta filter (which passes red light and blue light) are in filtering states, the display element may appear red. Likewise, when the magenta filter (which passes red light and blue light) and the cyan filter (which passes green light and blue light) are in filtering states, the display element may appear blue. Thus, a single color filter in a filtering state, or any combination of two or more color filters in filtering states, may be used to generate different colors.

It should be appreciated that when all three filters are in non-filtering states, white light may pass directly through the color element (as shown in FIG. 5). It further should be appreciated that when all three filters are in filtering states, color element 40' may appear dark. For example, if the cyan filter is in a filtering state, the cyan filter filters out all light except cyan light. Thus, since cyan light is composed of green light and blue light, both green light and blue light may pass through. When the yellow filter is in a filtering state, then all light is filtered out except yellow light. Since yellow light is composed of green light and red light, the green light from the cyan filter passes through the yellow filter, while the blue light from the cyan filter is blocked. When the magenta filter, which passes red and blue light, is in a filtering state, then the green light from the yellow filter is blocked and no light passes through the final filter, thereby causing the color element to appear dark.

FIG. 6 illustrates one exemplary configuration of a color filter 70. Specifically, color filter 70 includes a fluid chamber 84 configured to contain a filtering fluid. Fluid chamber 84 may be substantially defined by plates (or side walls) 86, piezo-elements 92, 94, and barriers (or end caps). Although not illustrated, the barriers may seal fluid chamber 84 to prevent the fluid from leaking out of the chamber. Plates or side walls 86 may be glass, plastic, or other suitable material that permit light to pass through color filter 70.

Color filter 70 may further include a transparent region 88 and an opaque region 90. Transparent region 88 typically is configured to allow light to pass through the color filter. Opaque region 90 typically is configured to not allow light to pass through. Opaque region 90 may include a mask coupled to plates 86 or within plates 86, so as to prevent light from passing through a portion or portions of the filter.

As described briefly above, each filter has at least two states, an actuated (or filtering state) and a non-actuated (or non-filtering state). In the filtering state, light may pass through the filter, and the fluid contained within the filter. Specifically, light 82 passes through transparent region 88. In the filtering state, the fluid within a filter is substantially disposed within the transparent region. In the non-filtering state, the fluid may be disposed in the opaque region 90, allowing light to pass uninterrupted through transparent region 88.

The fluid may be moved between the two regions via a plurality of mechanisms, including, but not limited to, heat, pressure, etc. In the present embodiment, a liquid motion actuator in the form of a pair of piezo-elements 92, 94 is employed. The piezo-elements function to selectively push the fluid into the transparent region. Thus, one or more piezo-elements may be coupled with a fluid chamber. The piezo-elements may be selectively deformed to force the fluid from a resting region of the chamber outside the optical path into a select region of the chamber within the optical path. As best illustrated in FIGS. 7 and 8, fluid, generally indicated at 96, is contained within fluid chamber 84. FIG. 7 illustrates a non-filtering state, where fluid 96 is substantially outside of transparent region 88 (indicated schematically by dashed lines). As illustrated, fluid 96 is disposed substantially within the opaque region 90 (indicated schematically by dashed, double-dot lines). Thus, light directed through filter 70 may pass through transparent region unobstructed.

A voltage (as schematically illustrated in FIGS. 7 and 8) may be applied to each piezo-element 92, 94, thereby activating each piezo-element 92, 94. When activated, piezo-elements 92 and 94 may deform, squeezing fluid 96 from opaque region 90 to transparent region 88. FIG. 8 schematically illustrates the effect of activation of piezo-elements 92 and 94. As illustrated, upon activation piezo-elements 92, 94 constrict the chamber and force the fluid to move into the transparent region. As described above, when fluid 96 is disposed within transparent region 88, impinging light may be filtered as it passes through the fluid. The fluid permits some wavelengths (colors) of light to pass while blocking other wavelengths (colors) of light. It should be noted that one, two, three, or more piezo-elements may be used without departing from the scope of the invention.

Moreover, the piezo-elements may be strips, which align one or more sides of the chamber. For example, the piezo-elements may extend around the chamber in a U-shape, a V-shape, etc.

The capillary characteristics of the chamber may be used to promote flow of the fluid within the chamber. For example, any one or more of the surfaces within chamber 84 may be treated to promote the fluid to return to the opaque region. For example, the chamber surfaces within the opaque region may be etched to create a hydrophilic surface. After activation of the piezo-element, the fluid may be attracted to the opaque region, due to the surface treatment. Moreover, in addition to, or alternatively, the surfaces of the chamber within the transparent region may be treated such that they are hydrophobic. Such a treatment may promote the fluid to flow out of the transparent region upon deactivation of the piezo-elements.

Although illustrated where actuation of the piezo-elements force the filtering fluid from the opaque region to the transparent region, it should be appreciated that the filter may be configured such that the piezo-elements force the filtering fluid from the transparent region to the opaque region. Thus, the resting position of the fluid may depend on the configuration of the filter.

It should be appreciated that the voltage applied to the piezo-elements may be finely controlled. By finely controlling the voltage, various amounts of fluid may be forced into transparent region 88. Thus, a portion of the light may be filtered, while another portion of the light may be passed through and unfiltered. Such a configuration allows for gradations in color. For example, a finely controlled yellow filter may selectively emit very light yellow light, light yellow light, yellow light, etc.

In some embodiments, multiple liquid motion actuators may be used in combination. For example, a single filter may include both a bubble generator and multiple piezo-elements. By controlling each actuator, it may be possible to selectively modulate the amount of light passing through each filter enabling the production of a substantial number of colors.

Accordingly, as set forth above, a method for filtering light is provided. The method includes directing light along an optical path onto a filter, the filter having filtering fluid moveable into and out of the optical path, selectively moving the filtering fluid within the filter, and directing light through the filter. Selectively moving the filtering fluid within the filter may include selectively moving the filtering fluid substantially into the optical path. Moreover, directing light through the filter may include passing light through the filtering fluid to produce filtered light. In come embodiments, selectively moving the filtering fluid may include selectively generating a bubble within the optical path displacing the filtering fluid to outside the optical path. In such embodiments, directing light through the filter may include reflecting light off the bubble in the optical path. In other embodiments, selectively moving the filtering fluid may include selectively actuating at least one piezo-element, which may include deforming the filter to force the filtering fluid into the optical path.

Moreover, a color generator for a display system having an optical path is provided. The color generator may include a plurality of color filters within the optical path. For example, the color generator may include a first color filter having a first color filtering liquid selectively adapted to filter impinging light, a second color filter having a second color filtering liquid selectively adapted to filter impinging light, and a third color filter having a third color filtering liquid selectively adapted to filter impinging light. The color generator may further include promotion means to move the filtering liquid into and out of the optical path. For example, the color generator may include a first promotion means linked to the first color filter to promote motion of the first color filtering liquid into and out of the optical path, a second promotion means linked to the second color filter to promote motion of the second color filtering liquid into and out of the optical path, and a third promotion means linked to the third color filter to promote motion of the third color filtering liquid into and out of the optical path. The color filters may be red, green, blue, cyan, magenta, yellow, or any other color. Additionally, the promotion means may include a bubble generator and/or a piezo-element.

While various alternative embodiments and arrangements of a method and system for generating colored light have been shown and described above, it will be appreciated by those of skill in the art that numerous other embodiments, arrangements, and modifications are possible and are within the scope of the invention. In other words, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring, nor excluding, two or more such elements.

What is claimed is:

1. A light-filtering element for a display device, comprising:
   at least one filter having a chamber with a filtering fluid, the chamber defining an optical path entering a first side of the chamber and exiting a second side of the chamber opposite the first side; and
   a liquid motion actuator selectively configured to move the filtering fluid substantially into and out of the optical path by altering the chamber to effect displacement of the filtering fluid within the chamber.

2. The light-filtering element of claim 1, wherein the liquid motion actuator is configured to selectively alter dimensions of the chamber to displace the filtering fluid from the optical path.

3. The light-filtering element of claim 2, wherein the dimensions of the chamber affect intensity of light passing through the chamber.

4. The light-filtering element of claim 1, wherein the filtering fluid is a colored liquid.

5. A color-generating device, comprising:
   a plurality of color elements disposed in an optical path entering a first side of the color elements and exiting a second side of the color elements opposite the first side, wherein each color element includes at least one filter having a chamber with a filtering liquid, the filtering liquid being selectively disposed in the optical path; and
   a liquid motion actuator configured to selectively move the filtering liquid into and out of the optical path to selectively reflect light in the optical path.

6. The color-generating device of claim 5, wherein the liquid motion actuator is configured to selectively alter the chamber to move the filtering liquid into and out of the optical path.

7. The color-generating device of claim 5, wherein the liquid motion actuator is configured to alter the chamber to selectively move the filtering liquid into and out of the optical path.

8. The color-generating device of claim 7, wherein the chamber includes a surface treatment adapted to promote a flow of filtering liquid out of the optical path under direction of the liquid motion actuator.

9. A display system, comprising:
   an illumination source configured to produce light and direct light along an optical path;
   a color generator disposed in the optical path, the color generator including one or more color elements, where one or more color elements has at least one filter with a color-filtering fluid and an associated liquid motion actuator, the liquid motion actuator configured to selectively move a substantial volume of the color-filtering liquid by selectively altering the chamber to effect reflection of light to selectively configure the filter in at least one of a filtering state and a non-filtering state, wherein light directed along the optical path enters a first side of the filter and exits a second side of the filter opposite the first side; and
   a display surface configured to receive light from the color generator to produce a color image.

10. The display system of claim 9, wherein the at least one filter has a transparent region disposed in the optical pathway, and where the color-filtering liquid is selectively positionable substantially within the transparent region when the filter is in a filtering state.

11. The display system of claim 9, wherein the at least one filter has a transparent region disposed in the optical pathway and where the color-filtering liquid is selectively positionable substantially outside the transparent region when the filter is in the non-filtering state.

12. The display system of claim 9, wherein each color element includes a red filter with red-filtering liquid, a green filter with green-filtering liquid, and a blue filter with a blue-filtering liquid, each filter being separately configurable in a filtering state and a non-filtering state to produce different colored light.

13. A color element for a display system having a light source, the color element comprising:
   a plurality of chambers, each chamber containing a filtering fluid; and
   an electrically-actuated element coupled with each chamber, the electrically-actuated element being configured to selectively alter each chamber to move the filtering fluid between a region of the chamber outside a light path and a region of the chamber within the light path:
   wherein the light path enters a first side of the chamber and exits a second side of the chamber opposite the first side.

14. The color element of claim 13, wherein the chamber includes a surface treatment adapted to promote a flow of fluid out of the light path under direction of the electrically-actuated element.

15. The color element of claim 13, wherein the region of the chamber within the light path is hydrophobic.

16. The color element of claim 13, wherein the region of the chamber outside the light path is hydrophilic.

17. A method of filtering light, the method comprising:
directing light along an optical path entering a first side of a filter and exiting a second side of the filter opposite the first side, the filter having filtering liquid moveable into and out of the optical path;
selectively moving the filtering fluid within the filter by altering dimensions of the filter; and
directing light through the filter.

18. The method of claim 17, wherein selectively moving the filtering liquid within the filter includes selectively moving the filtering liquid substantially into the optical path, and directing light through the filter includes passing light through the filtering liquid to produce filtered light.

19. The method of claim 17, wherein selectively altering dimensions of the filter includes actuating at least one electrically-actuated element to deform the filter, and thereby, to force the filtering liquid into the optical path.

20. The method of claim 19, wherein directing the light through the filter includes passing the light through the filtering liquid to produce a color.

21. A light-filtering element for a display device, comprising:
at least one filter having a chamber with a filtering fluid, the chamber defining an optical path entering a first side of the chamber and exiting a second side of the chamber opposite the first side; and
a liquid motion actuator selectively configured to move the filtering fluid substantially into and out of the optical path and by selectively altering the dimensions of the chamber.

22. The light-filtering element of claim 21, wherein the dimensions of the chamber affect intensity of light passing through the chamber.

23. A color-generating device, comprising:
a plurality of color elements disposed in an optical path entering a first side of the color elements and exiting a second side of the color elements opposite the first side, wherein each color element includes at least one filter having a chamber with a filtering liquid, the filtering liquid being selectively disposed in the optical path; and
a liquid motion actuator configured to selectively move the filtering liquid into and out of the optical path by selectively altering the chamber.

24. A color-generating device, comprising:
a plurality of color elements disposed in an optical path entering a first side of the color elements and exiting a second side of the color elements opposite the first side, wherein each color element includes at least one filter having a chamber with a filtering liquid, the filtering liquid being selectively disposed in the optical path; and
a liquid motion actuator configured to selectively move the filtering liquid into and out of the optical path by altering the chamber.

25. The color-generating device of claim 24, wherein the chamber includes a surface treatment adapted to promote a flow of filtering liquid out of the optical path under direction of the liquid motion actuator.

* * * * *

UNITED STATES PATENT AND TRADEMARK OFFICE
CERTIFICATE OF CORRECTION

PATENT NO. : 7,232,226 B2 Page 1 of 1
APPLICATION NO. : 10/728642
DATED : June 19, 2007
INVENTOR(S) : Lassar et al.

It is certified that error appears in the above-identified patent and that said Letters Patent is hereby corrected as shown below:

In the Claims

Col. 10 (line 55), delete "path:" and insert therefor --path;--.

Signed and Sealed this

Twentieth Day of November, 2007

JON W. DUDAS
*Director of the United States Patent and Trademark Office*